(12) United States Patent
Chen et al.

(10) Patent No.: US 7,746,309 B2
(45) Date of Patent: Jun. 29, 2010

(54) DRIVING CIRCUIT HAVING STATIC DISPLAY UNITS AND LIQUID CRYSTAL DISPLAY DEVICE USING THE SAME

(75) Inventors: Eddy Giing-Lii Chen, Miao-Li (TW); Sz-Hsiao Chen, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 601 days.

(21) Appl. No.: 11/644,289

(22) Filed: Dec. 21, 2006

(65) Prior Publication Data
US 2007/0139332 A1 Jun. 21, 2007

(30) Foreign Application Priority Data
Dec. 21, 2005 (CN) .................. 2005 1 0121046

(51) Int. Cl.
G09G 3/36 (2006.01)
(52) U.S. Cl. .................. 345/90; 345/87; 345/100
(58) Field of Classification Search .......... 345/87–100, 345/204
See application file for complete search history.

(56) References Cited

U.S. PATENT DOCUMENTS

| | | | |
|---|---|---|---|
| 5,359,343 A | 10/1994 | Nakamura | |
| 6,967,649 B2 | 11/2005 | Sun | |
| 7,095,391 B2* | 8/2006 | Lee | 345/87 |
| 7,148,870 B2* | 12/2006 | Tada | 345/90 |
| 7,443,371 B2* | 10/2008 | Fujikawa | 345/96 |
| 2002/0118153 A1 | 8/2002 | Kimura | |
| 2003/0142054 A1 | 7/2003 | Tada | |
| 2003/0151582 A1* | 8/2003 | Ishii | 345/100 |
| 2003/0197673 A1* | 10/2003 | Nakamura | 345/99 |
| 2003/0227429 A1 | 12/2003 | Shimoshikiryo | |
| 2008/0088552 A1* | 4/2008 | Toya | 345/84 |
| 2008/0238850 A1* | 10/2008 | Watanabe | 345/90 |

FOREIGN PATENT DOCUMENTS

| | | |
|---|---|---|
| CN | 1365095 A | 8/2002 |
| CN | 1437183 A | 8/2003 |
| CN | 1482593 A | 3/2004 |
| TW | 578125 B | 3/2004 |

* cited by examiner

*Primary Examiner*—Nitin Patel
(74) *Attorney, Agent, or Firm*—Wei Te Chung

(57) ABSTRACT

An exemplary liquid crystal display device (1) includes a first substrate (3), a second substrate (2) facing the first substrate, and a liquid crystal layer (4) sandwiched between the first substrate and the second substrate. The first substrate includes a plurality of scan lines (11); a plurality of first and second parallel data lines (12, 22) orthogonal to the scan lines; a plurality of first and second thin film transistors (14, 24), positioned near a crossing of a corresponding scan line and a corresponding first data line, respectively; a plurality of first and second pixel electrodes (15, 25) electrically coupled to the first and second thin film transistors, respectively; a plurality of first and second static display units (19, 29) for providing voltage to the first and second pixel electrodes in a static display mode.

10 Claims, 8 Drawing Sheets

DRIVING CIRCUIT HAVING STATIC DISPLAY UNITS AND LIQUID CRYSTAL DISPLAY DEVICE USING THE SAME

FIELD OF THE INVENTION

The present invention relates to liquid crystal display (LCD) devices, and more particularly to a driving circuit having static display units and an LCD device using the same, such that the LCD device is capable of displaying 64 gray scale levels in a static display mode.

BACKGROUND

Nowadays, small LCD devices are more and more commonly used in portable electronic equipment, such as mobile phones, personal digital assistants (PDAs), and the like. Therefore, the issue of reducing power consumption of these kinds of LCD devices is becoming more important.

In order to reduce the power consumption of LCD devices, the LCD industry has developed a kind of technique in which the display status of an LCD device is divided into two modes. One of these is an active display mode, and the other is a static display mode. An example of the static display mode is the image shown on a mobile phone LCD when the mobile phone is in a call waiting status. In the active display mode, the operation of the LCD device is normal full operation. For example, the LCD device may be a thin-film transistor LCD (TFT-LCD) device. In the static display mode, the LCD device uses a static random access memory (SRAM) for supplying power to pixel regions, so as to reduce power consumption.

Referring to FIG. 6, this is a diagram of part of a driving circuit of a conventional active matrix LCD device. The LCD device 100 includes a plurality of parallel scan lines 101, and a plurality of parallel data lines 102 orthogonal to the scan lines 101 so as to define a plurality of single sub pixel units 500. The LCD device 100 also includes a common electrode 107.

Referring to FIG. 7, an enlarged circuit diagram of one of the sub pixel units 500 is shown. The sub pixel unit 500 includes a thin film transistor 104, a pixel electrode 105, and a static display unit 109. The thin film transistor (TFT) 104 is positioned near a crossing of a corresponding scan line 101 and a corresponding data line 102. A gate electrode 1040 of the first TFT 104 is electrically coupled to the corresponding scan line 101, and a source electrode 1041 of the first TFT 104 is electrically coupled to the corresponding data line 102. Further, a drain electrode 1042 of the first TFT 104 is electrically coupled to a corresponding pixel electrode 105. The pixel electrode 105 and the common electrode 107 cooperatively form a capacitor 108.

The static display unit 109 includes an SRAM 1094, a second TFT 1091, and a third TFT 1092. The SRAM 1094 includes four terminals: $V_{dd}$, $V_{ss}$, $V_{in}$, and $V_{out}$. The terminal $V_{dd}$ is electrically coupled to a high voltage $V_H$, the terminal $V_{ss}$ is electrically coupled to a low voltage $V_L$, the terminal $V_{in}$ is electrically coupled to a drain electrode of the second TFT 1091, and the terminal $V_{out}$ is electrically coupled to a source electrode of the third TFT 1092. A source electrode of the second TFT 1091 is electrically coupled to a drain electrode of the third TFT 1092, and these two electrodes cooperate with each other to form an output terminal of the static display unit 109. The output terminal is electrically coupled to the drain electrode 1042 of the first TFT 104. The gate electrodes of the second and third TFTs 1091 and 1092 are each electrically coupled to a time control register (Tcon, not shown), which is used for controlling the second and third TFTs 1091 and 1092 to turn on or turn off.

The operational process of the SRAM 1094 is as follows. When a high voltage is transmitted into the SRAM 1094 via the terminal $V_{in}$, the terminal $V_{in}$ and the terminal $V_{out}$ output the voltage of the terminal $V_{dd}$ and the terminal $V_{ss}$, respectively; and when a low voltage is transmitted into the SRAM 1094 via the terminal $V_{in}$, the terminal $V_{in}$ and the terminal $V_{out}$ output the voltage of the terminal $V_{ss}$ and the terminal $V_{dd}$, respectively.

The LCD device 100 includes two display modes: active display mode and static display mode. In the active display mode, the operational process of the LCD device 100 is equal to a normal thin film transistor LCD (TFT-LCD) device. That is, each of the static display units 109 does not work, and gray scale voltage is supplied to the pixel electrodes 105 via the data lines 102 and the first TFTs 104 for displaying images.

Referring to FIG. 8, the operational process of the sub pixel unit 500 when in an on state is shown. Plot (A) represents a waveform diagram of scanning voltage supplied to the scan lines 101. Plot (B) represents a waveform diagram of voltage supplied to the data lines 102. Plot (C) represents a waveform diagram of voltage supplied to the gate electrode of the second TFT 1091. Plot (D) represents a waveform diagram of voltage supplied to the gate electrode of the third TFT 1092. Plot (E) represents a waveform diagram of voltage supplied to the pixel electrode 105. Plot (F) represents a waveform diagram of voltage supplied to the common electrode 107. Plot (G) represent a waveform diagram of a difference between voltages supplied to the pixel electrode 105 and the common electrode 107.

When the time t is equal to $t_1$, a scanning voltage is supplied to the gate electrode 1040 of the first TFT 104 via the scan line 101, so as to turn on the first TFT 104. The Tcon turns on the second TFT 1091, while the third TFT 1092 is in an off state. At the same time, the data line 102 provides a high voltage for driving the SRAM 1094 via the first and second TFTs 104 and 1091. When the time t is equal to $t_2$, the first TFT 104 is turned off until a next active display mode. At the same time, a high voltage $V_H$ is outputted from the terminal $V_{dd}$, and is supplied to the pixel electrode 105 via the second TFT 1091. After that, the Tcon alternately turns on and turns off the second and third TFTs 1091 and 1092, and then the SRAM 1094 alternately supplies the voltage of the terminal $V_{dd}$ and the terminal $V_{ss}$ to the pixel electrode 105. When t is equal to $t_3$, the second TFT 1091 is turned off, and the third TFT 1092 is turned on. At the same time, a low voltage $V_L$ is outputted from the terminal $V_{ss}$, and is supplied to the pixel electrode 105 via the third TFT 1092. When the time t is equal to $t_4$, the second TFT 1091 is turned on, and the third TFT 1092 is turned off. At the same time, a high voltage $V_H$ is outputted from the terminal $V_{dd}$, and is supplied to the pixel electrode 105 via the second TFT 1091. The operational process complies with the circulation mentioned above. The common electrode 107 also meet with the circulation. That is, the common electrode 107 is $V_H$ at time $t_1$, varying to $V_L$ at time $t_3$, and returning to $V_H$ at time $t_4$. Therefore, the difference between the pixel electrode 105 and the common electrode 107 is maintained at zero, and the sub pixel unit 500 is in an on state (display white).

The sub pixel unit 500 has an operational process in an off state similar to that in an on state. In detail, a low voltage is provided by the data lines 102 at an initial point in time. When the voltage of the common electrode 107 is a high voltage $V_H$, the voltage of the pixel electrode 105 is a low voltage $V_L$. In addition, when the voltage of the common electrode 107 is a low voltage $V_L$, the voltage of the pixel electrode 105 is a high voltage $V_H$. The difference between the common electrode 107 and the pixel electrode 105 is maintained at $V_H$-$V_L$, and so the sub pixel unit 500 is in an off state (display black).

While the LCD device 100 in the static display mode, voltage is supplied by the static display unit 109. However, the static display unit 109 can only supplied two different voltages, and then each sub pixel unit 500 can only display a gray scale of 2 levels. Each pixel of the LCD device 100 includes three sub pixel units 500, such as red, green and blue sub pixel units 500. Therefore, each pixel of the LCD device 100 can display a gray scale of 8 levels in a static display mode. However, a gray scale of 8 levels is rather limited, and the LCD device 100 is not considered to be capable of displaying rich and colorful images.

It is desired to provide a driving circuit and an LCD device which can overcome the above-described deficiencies.

SUMMARY

A driving circuit of a liquid crystal display device includes: a plurality of parallel scan lines; a plurality of first parallel data lines orthogonal to the scan lines; a plurality of second parallel data lines orthogonal to the scan lines and parallel to the first data lines; a plurality of first thin film transistors, positioned near a crossing of a corresponding scan line and a corresponding first data line; a plurality of second thin film transistors, positioned near a crossing of a corresponding scan line and a corresponding second data line; a plurality of first pixel electrodes electrically coupled to the first thin film transistors; a plurality of second pixel electrodes electrically coupled to the second thin film transistors; a plurality of first static display unit having an output terminal electrically coupled to the first thin film transistor, and the first static display unit provides voltage to the first pixel electrode in a static display mode; and a plurality of second static display unit having an output terminal electrically coupled to the second thin film transistor, and the second static display unit provides voltage to the second pixel electrode in a static display mode.

A liquid crystal display device includes a first substrate, a second substrate facing the first substrate, and a liquid crystal layer sandwiched between the first substrate and the second substrate. The first substrate includes a plurality of parallel scan lines; a plurality of first parallel data lines orthogonal to the scan lines; a plurality of second parallel data lines orthogonal to the scan lines and parallel to the first data lines; a plurality of first thin film transistors, positioned near a crossing of a corresponding scan line and a corresponding first data line; a plurality of second thin film transistors, positioned near a crossing of a corresponding scan line and a corresponding second data line; a plurality of first pixel electrodes electrically coupled to the first thin film transistors; a plurality of second pixel electrodes electrically coupled to the second thin film transistors; a plurality of first static display unit having an output terminal electrically coupled to the first thin film transistor, and the first static display unit provides voltage to the first pixel electrode in a static display mode; and a plurality of second static display unit having an output terminal electrically coupled to the second thin film transistor, and the second static display unit provides voltage to the second pixel electrode in a static display mode.

Advantages and novel features of the driving circuit and liquid crystal display will become more apparent from the following detailed description when taken in conjunction with the accompanying drawings, in which:

DETAILED DESCRIPTION OF PREFERRED EMBODIMENTS

Reference will now be made to the drawings to describe preferred and exemplary embodiments of the present invention in detail.

Figure 1:
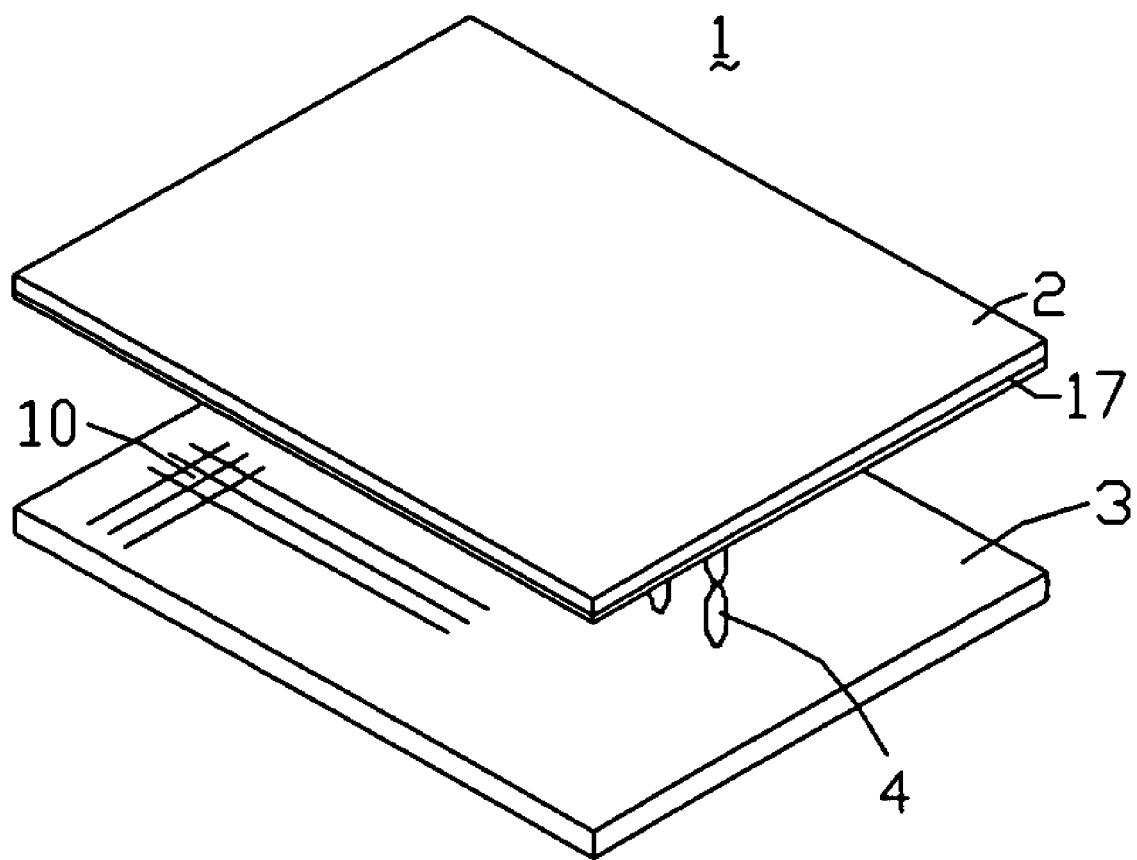
FIG. 1 is a schematic, abbreviated, isometric view of an LCD device according to an exemplary embodiment of the present invention.

Referring to FIG. 1, this is a schematic, abbreviated, isometric view of an LCD device according to an exemplary embodiment of the present invention. The LCD device 1 includes a glass first substrate 2, a glass second substrate 3 facing the first substrate 2, and a liquid crystal layer 4 sandwiched between the first substrate 2 and the second substrate 3. The first substrate 2 includes a common electrode 17 thereon, and the second substrate 3 includes a driving circuit 10 thereon.

Figure 2:
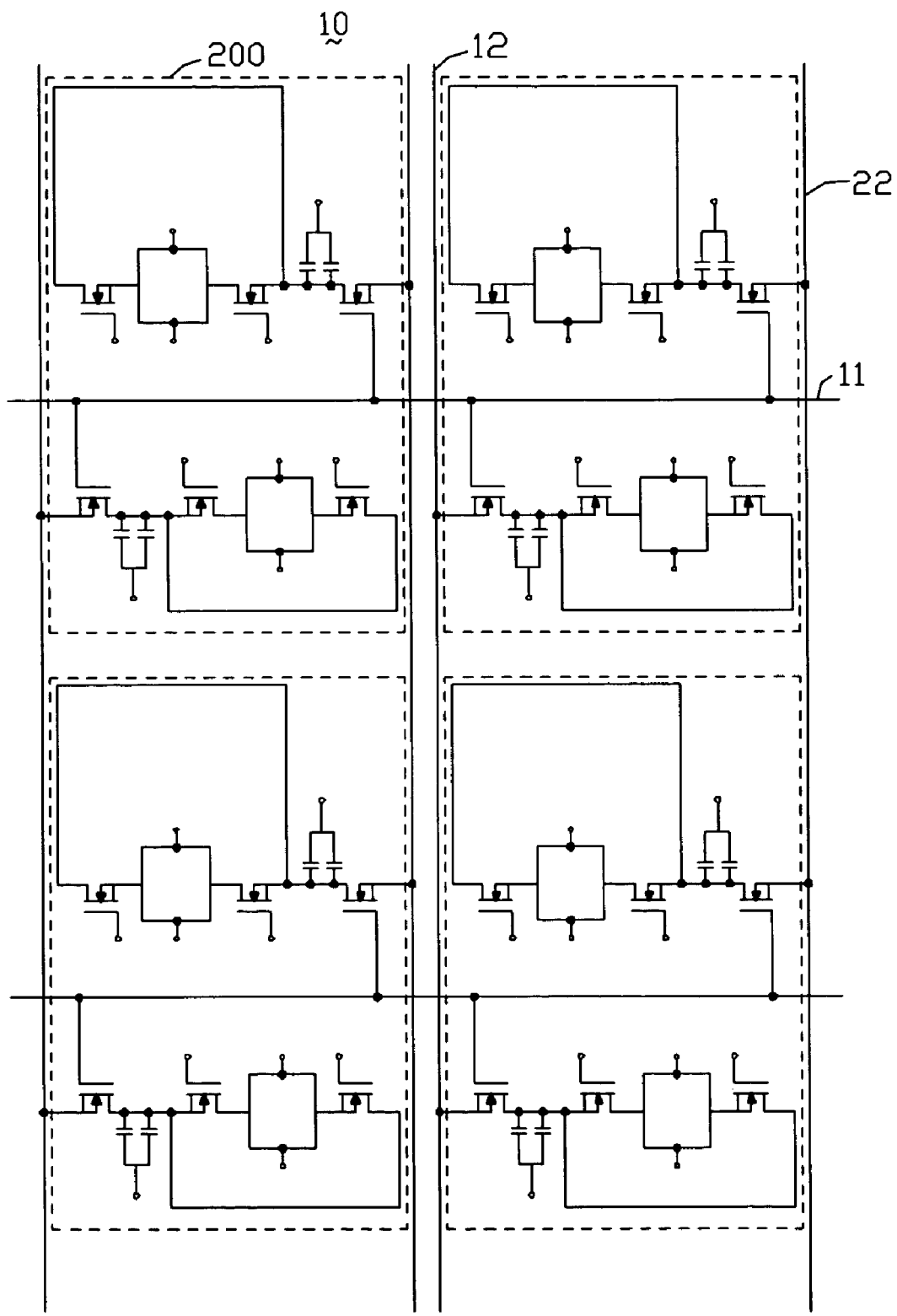
FIG. 2 is a diagram of part of a driving circuit of the LCD device of FIG. 1.

Referring to FIG. 2, this is a diagram of part of the driving circuit 10. The driving circuit 10 includes a plurality of parallel scan lines 11, and a plurality of parallel first and second data lines 12 and 22 orthogonal to the scan lines 11 respectively, so as to define a plurality of single sub pixels 200.

Figure 3:
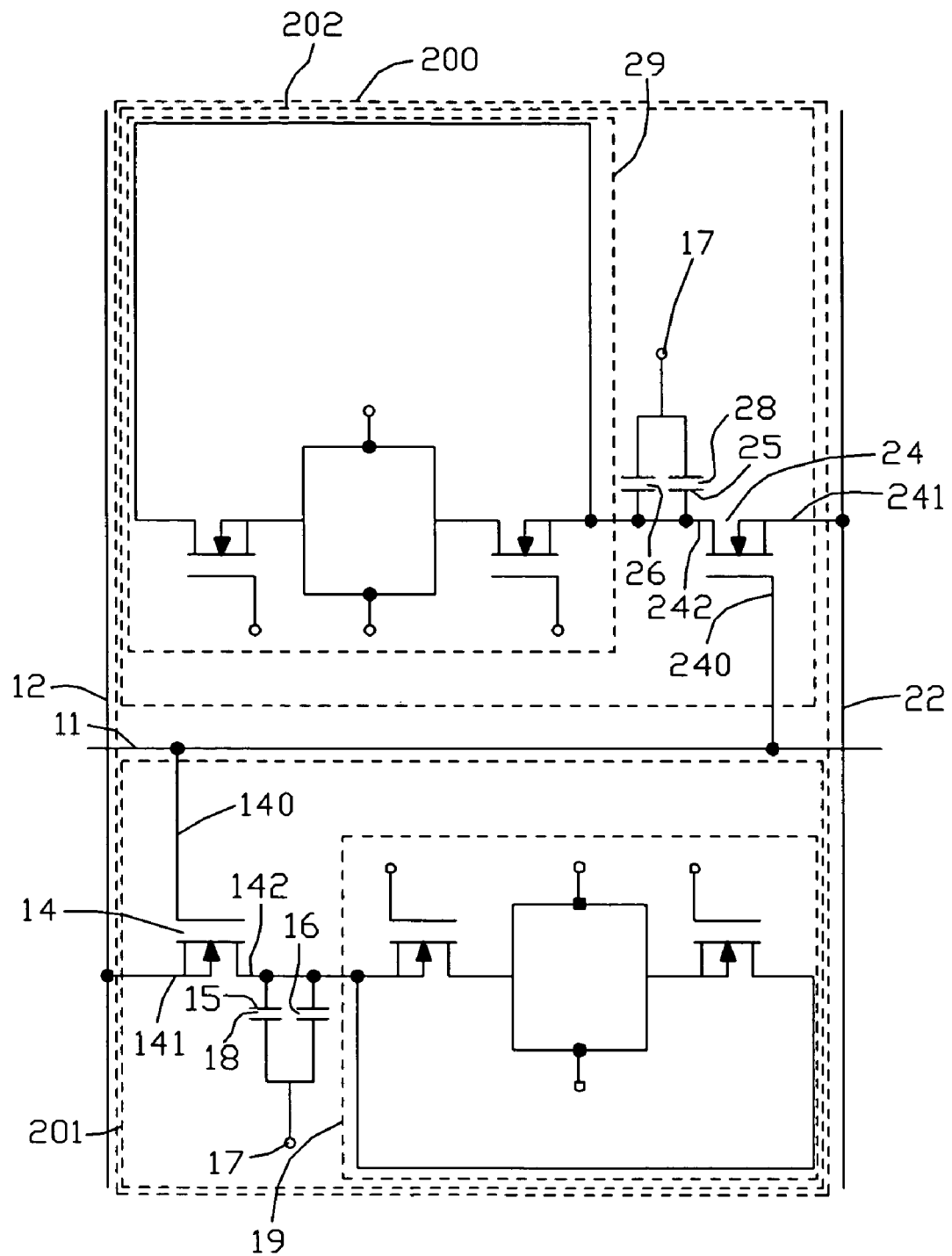
FIG. 3 is an enlarged circuit diagram of one of sub pixels of the LCD device of FIG. 2.

Referring to FIG. 3, this is an enlarged circuit diagram of an exemplary one of the sub pixels 200. The sub pixel 200 includes a first sub pixel unit 201 and a second sub pixel unit 202 disposed at two sides of the scan line 11, respectively. The first sub pixel unit 201 includes a first thin film transistor (TFT) 14, a first pixel electrode 15, a first capacitor 16, and a first static display unit 19. The second sub pixel unit 202 includes a second thin film transistor 24, a second pixel electrode 25, a second capacitor 26, and a second static display unit 29.

The first TFT 14 is positioned near a crossing of the scan line 11 and the data line 12. A gate electrode 140 of the first TFT 14 is electrically coupled to the scan line 11, and a source electrode 141 of the first TFT 14 is electrically coupled to the data line 12. Further, a drain electrode 142 of the first TFT 14 is electrically coupled to the corresponding pixel electrode 15. The pixel electrode 15 and the common electrode 17 cooperatively form a liquid crystal capacitor 18. The first capacitor 16 is connected in parallel with the liquid crystal capacitor 18 for maintaining the voltage of the first sub pixel unit 201. The first static display unit 19 is electrically coupled to the drain electrode 142 of the first TFT 14.

The second TFT 24 is positioned near a crossing of the scan line 11 and the data line 22. A gate electrode 240 of the second TFT 24 is electrically coupled to the scan line 11, and a source electrode 241 of the second TFT 24 is electrically coupled to the data line 22. Further, a drain electrode 242 of the second TFT 24 is electrically coupled to the corresponding pixel electrode 25. The pixel electrode 25 and the common electrode 17 cooperatively form a liquid crystal capacitor 28. The second capacitor 26 is connected in parallel with the liquid crystal capacitor 28 for maintaining the voltage of the second sub pixel unit 202. The second static display unit 29 is electrically coupled to the drain electrode 242 of the second TFT 14.

An area of the first pixel electrode 15 may be different to or be equal to that of the second pixel electrode 25. In the illustrated embodiment, a ratio of the area of the first pixel electrode 15 to the second pixel electrode 25 is 1:2.

Figure 4:
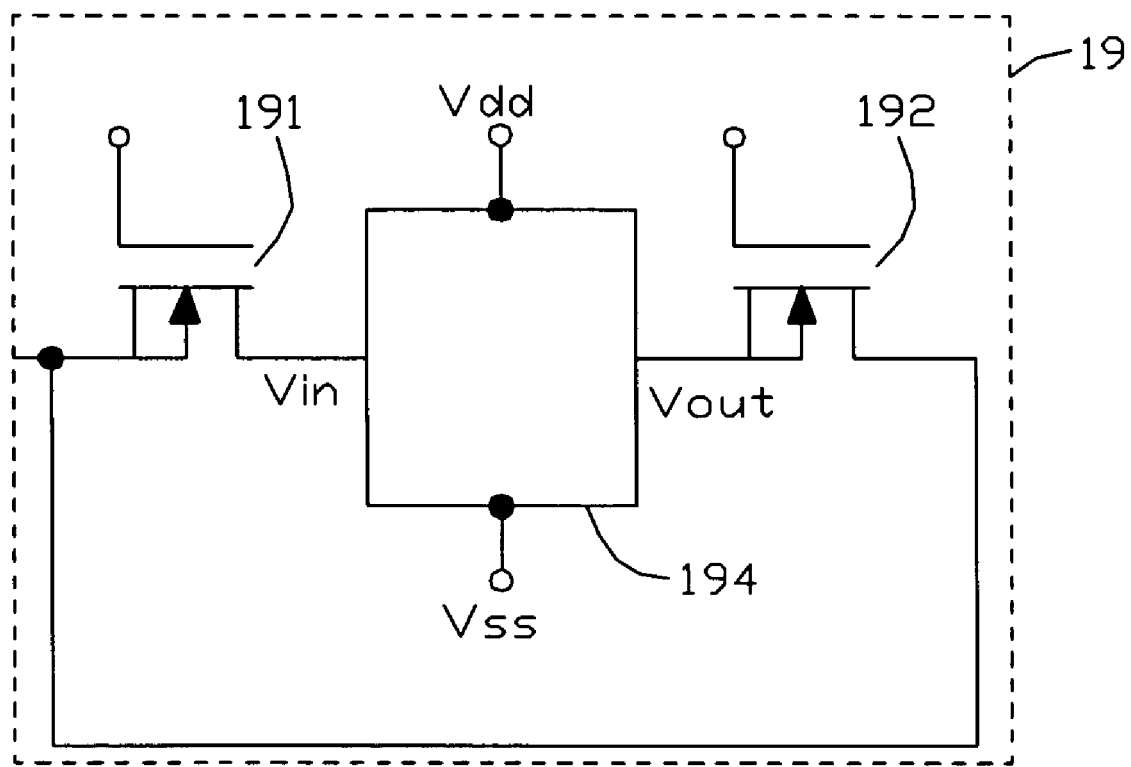
FIG. 4 is a detailed circuit diagram of a first static display unit of the sub pixel shown in FIG. 3.

The first static display unit 19 is substantially the same as the second static display unit 29. Referring to FIG. 4, this is a detailed circuit diagram of the first static display unit 19. The first static display unit 19 includes an SRAM 194, a third TFT 191, and a fourth TFT 192. The SRAM 194 includes four terminals: $V_{dd}$, $V_{ss}$, $V_{in}$, and $V_{out}$. The terminal $V_{dd}$ is electrically coupled to a high voltage $V_H$, the terminal $V_{ss}$ is electrically coupled to a low voltage $V_L$, the terminal $V_{in}$ is electrically coupled to a drain electrode of the third TFT 191, and the terminal $V_{out}$ is electrically coupled to a source electrode of the fourth TFT 192. A source electrode of the third TFT 191 is electrically coupled to a drain electrode of the fourth TFT 192, and these two electrodes cooperate with each other to form an output terminal of the static display unit 19. The gate electrodes of the third and fourth TFTs 191 and 192 are each electrically coupled to a time control register (Tcon, not shown), which is used for controlling the third and fourth TFTs 191 and 192 to turn on or turn off.

Figure 5:
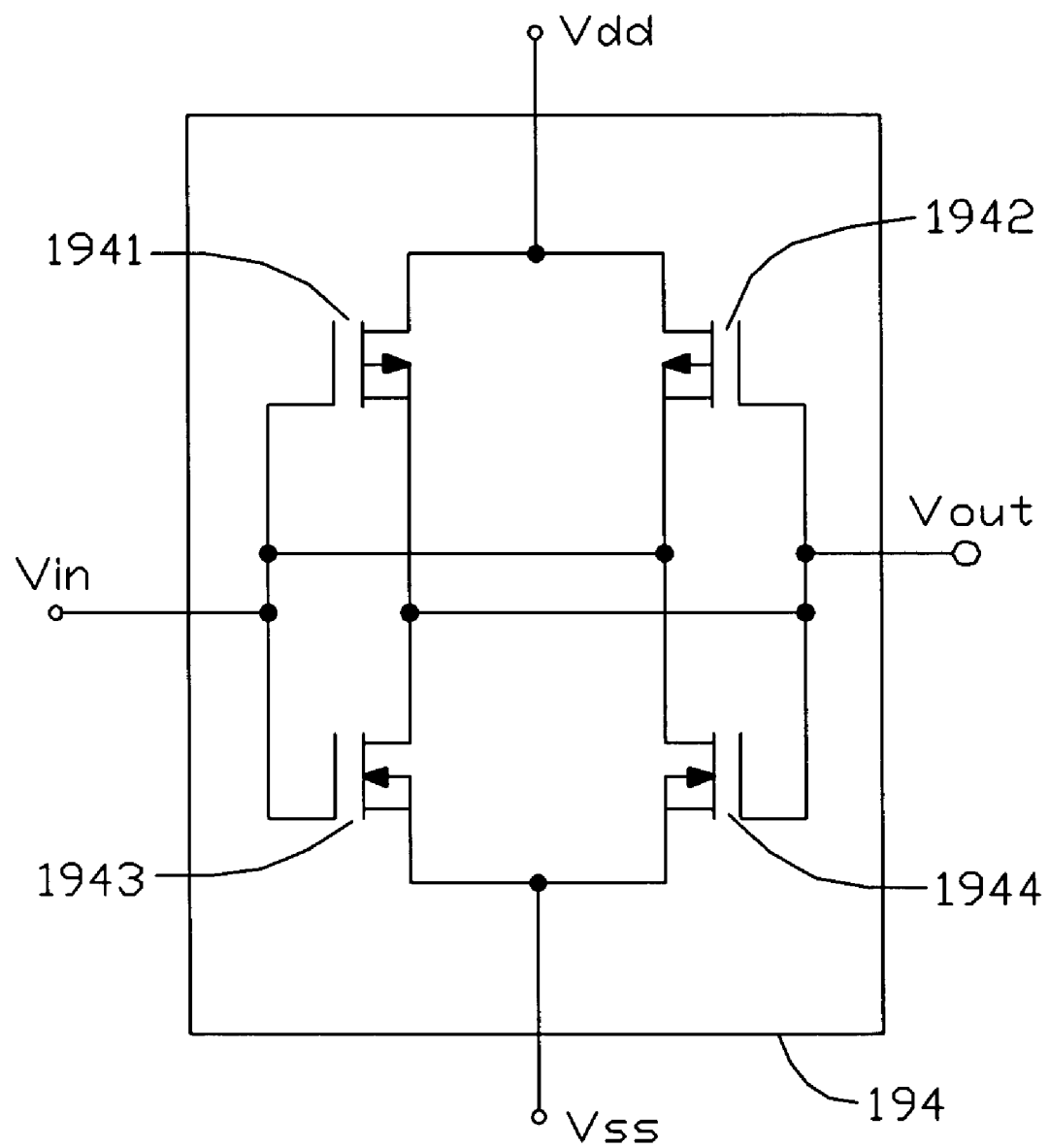
FIG. 5 is an enlarged circuit diagram of a static random access memory of the first static display unit of FIG. 4.
Figure 6:
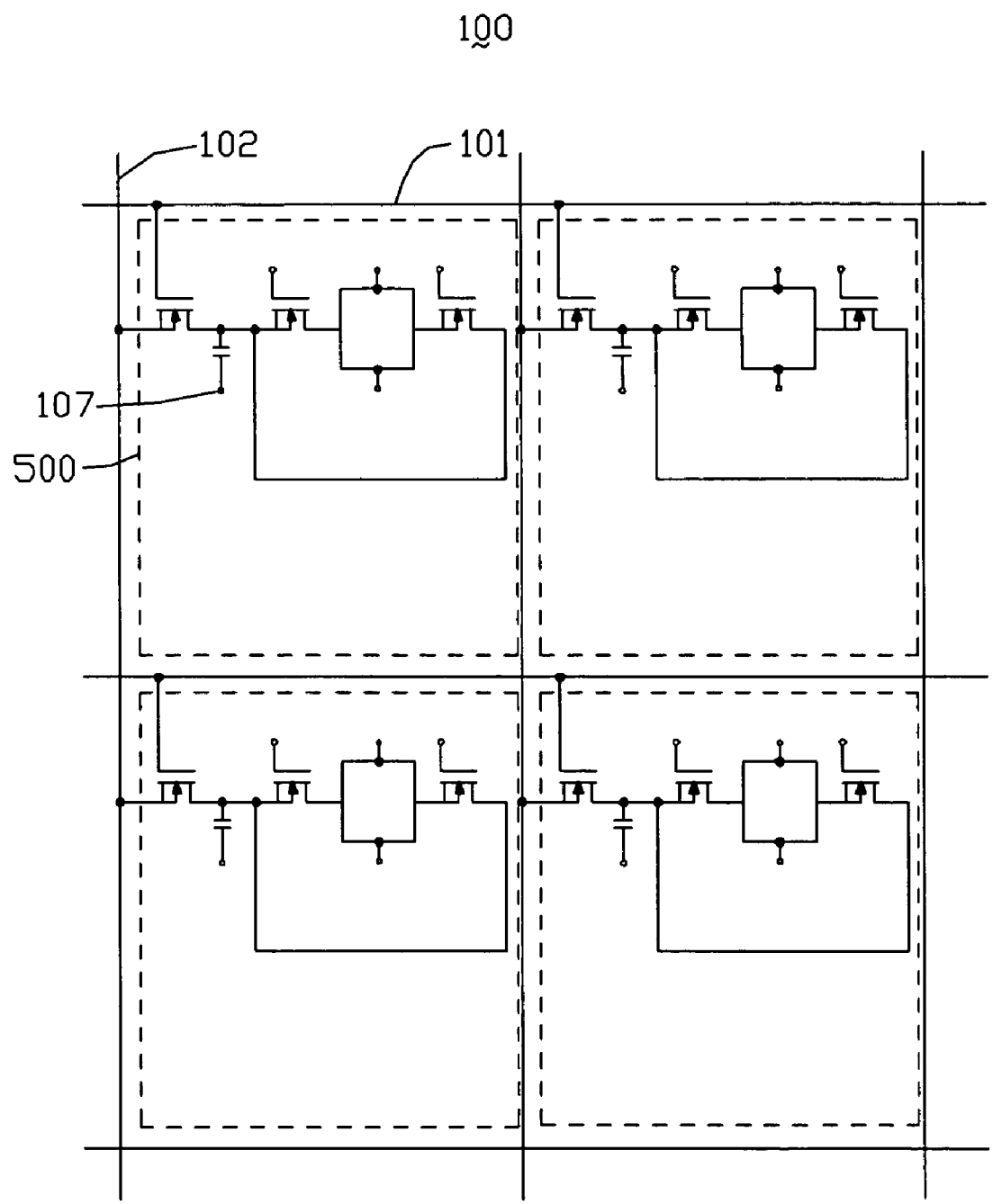
FIG. 6 is a diagram of part of a driving circuit of a conventional active matrix LCD device.
Figure 7:
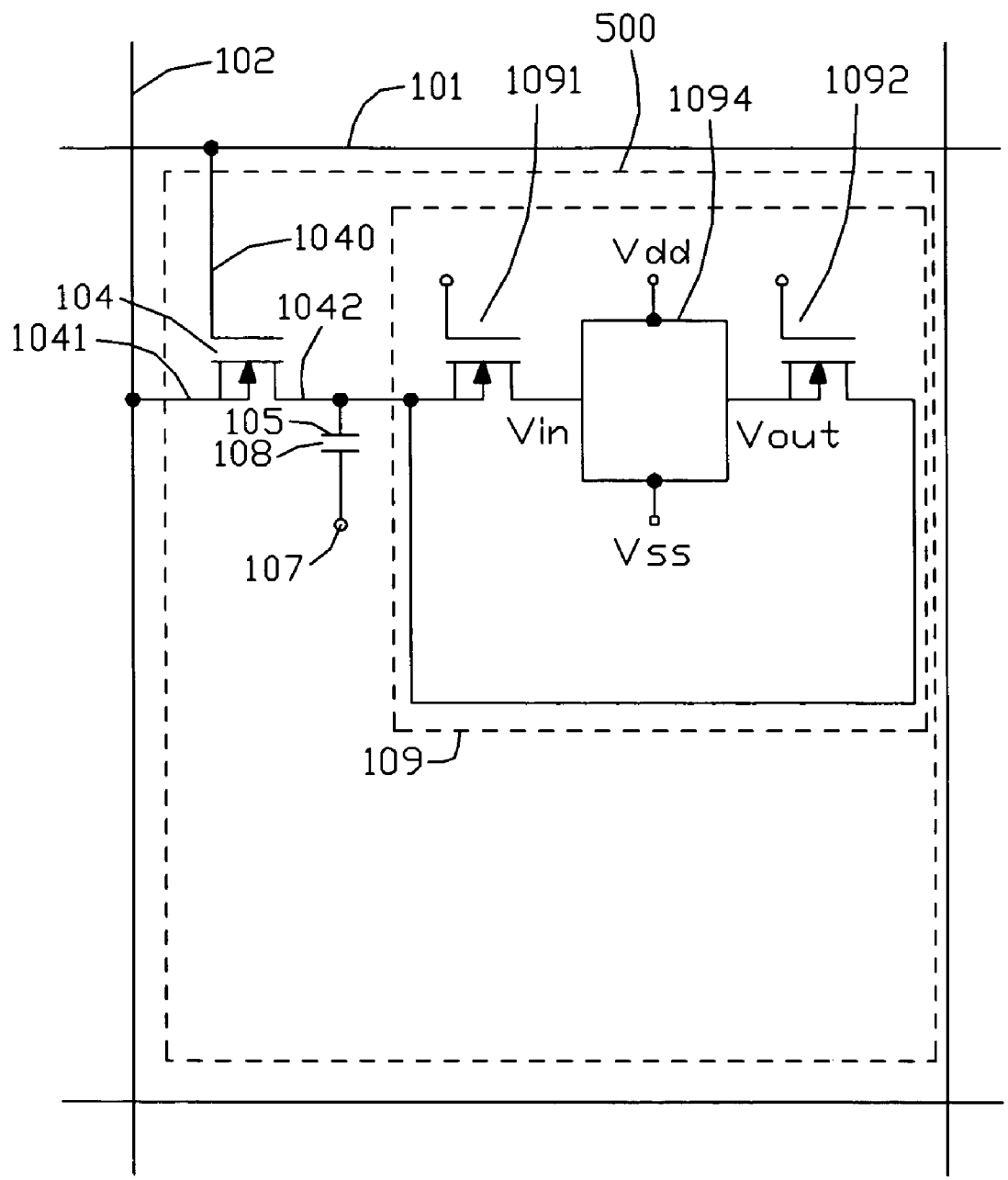
FIG. 7 is an enlarged circuit diagram of one of sub pixel units of the LCD device of FIG. 6.
Figure 8:
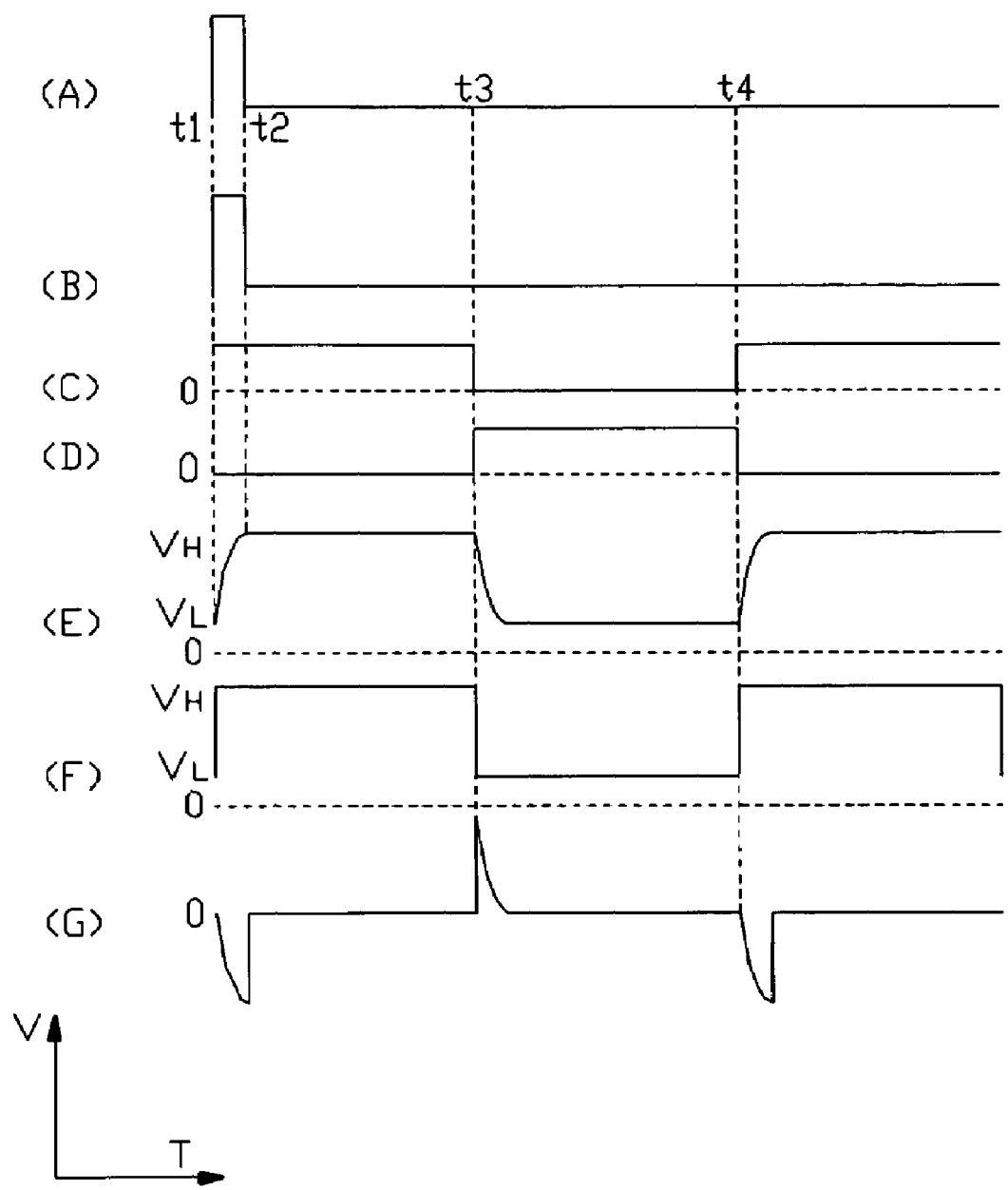
FIG. 8 shows waveform diagrams illustrating exemplary operation of the LCD device of FIG. 6.

Referring to FIG. 5, this is an enlarged circuit diagram of the SRAM 194. The SRAM 194 includes a fifth TFT 1941, a sixth TFT 1942, a seventh TFT 1943, and an eighth TFT 1944. The fifth and sixth TFTs 1941 and 1942 are positive thin film transistors, and the seventh and eighth TFTs 1943 and 1944 are negative thin film transistors. A gate electrode of the fifth TFT 1941 is electrically coupled to the terminal $V_{in}$, a source electrode of the fifth TFT 1941 is electrically coupled to the terminal $V_{out}$, and a drain electrode of the fifth TFT 1941 is electrically coupled to the terminal $V_{dd}$. A gate electrode of the sixth TFT 1942 is electrically coupled to the terminal $V_{out}$, a source electrode of the sixth TFT 1942 is electrically coupled to the terminal $V_{in}$, and a drain electrode of the sixth TFT 1942 is electrically coupled to the terminal $V_{dd}$. A gate electrode of the seventh TFT 1943 is electrically coupled to the terminal $V_{in}$, a source electrode of the seventh TFT 1943 is electrically coupled to the terminal $V_{ss}$, and a drain electrode of the seventh TFT 1943 is electrically coupled to the terminal $V_{out}$. A gate electrode of the eighth TFT 1944 is electrically coupled to the terminal $V_{out}$, a source electrode of the eighth TFT 1944 is electrically coupled to the terminal $V_{ss}$, and a drain electrode of the eighth TFT 1944 is electrically coupled to the terminal $V_{in}$.

The operation process of the SRAM 194 is that: when a high voltage is transmitted into the SRAM 194 via the terminal $V_{in}$, the terminal $V_{in}$ and the terminal $V_{out}$ outputs the voltage of the terminal $V_{dd}$ and the terminal $V_{ss}$, respectively; when a low voltage is transmitted into the SRAM 194 via the terminal $V_{in}$, the terminal $V_{in}$ and the terminal $V_{out}$ outputs the voltage of the terminal $V_{ss}$ and the terminal $V_{dd}$, respectively.

The LCD device 1 includes two display modes: active display mode and static display mode. In the active display mode, the operation process of the LCD device 1 is equal to a normal thin film transistor LCD device, that is, each of the static display units 19 and 29 doesn't work, and gray scale voltage is supplied to the pixel electrodes 15 and 25 via the data lines 12 and 22 as well as the first and second TFTs 14 and 24 respectively, for displaying images.

In the static display mode, the first and second sub pixel units 201 and 202 have an operation process similar to that of the sub pixel unit 500 of the conventional LCD device 100. Wherein, the scan lines 11 drives the first and second TFTs 14 and 24, the first and second data lines 12 and 22 provides voltages to drive the first and second static display units 19 and 29, respectively. After that, the scan line 11 and the data lines 12 and 22 stop work, and the first and second static display units 19 and 29 respectively provides voltage to drive the first and second sub pixels units 201 and 202 to display images until next active display mode.

The first and second sub pixel units 201 and 202 can display a gray scale of 2 levels, respectively, then the sub pixel 200 can display a gray scale of 4 levels. That is, when the first and second sub pixel units 201 and 202 both in an off states, the sub pixel 200 displays a first gray scale; when the first sub pixel unit 201 is in an off state, and the second sub pixel unit 202 is in an on state, the sub pixel 200 displays a second gray scale; when the first sub pixel unit 201 is in an on state, and the second sub pixel unit 202 is in an off state, the sub pixel 200 displays a third gray scale; when the first and second sub pixel units 201 and 202 both in an on states, the sub pixel 200 displays a fourth gray scale.

Compared with the sub pixel unit 500 of the conventional LCD device 100, the sub pixel 200 of the driving circuit 10 can display a gray scale of 4 levels. Each of pixel units of the LCD device 1 includes three sub pixels 200, such as red, green, and blue sub pixels 200. Therefore, each pixel of the LCD device 1 can display a gray scale of 64 levels in a static display mode. Therefore, the LCD device 200 can display rich and colorful images.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of shape, size, and arrangement of parts) within the principles of the invention to the full extent indicated by the broad general meaning of the terms in which the appended claims are expressed.

What is claimed is:

1. A driving circuit of a liquid crystal display device, comprising:
    a plurality of parallel scan lines;
    a plurality of first parallel data lines substantially orthogonal to the scan lines;
    a plurality of second parallel data lines substantially orthogonal to the scan lines and parallel to the first data lines;
    a plurality of first thin film transistors, each positioned near a crossing of a corresponding one of the scan lines and a corresponding one of the first data lines;
    a plurality of second thin film transistors, each positioned near a crossing of a corresponding one of the scan lines and a corresponding one of the second data lines;
    a plurality of first pixel electrodes electrically coupled to the first thin film transistors;
    a plurality of second pixel electrodes electrically coupled to the second thin film transistors;
    a plurality of first static display units each comprising an output terminal electrically coupled to a corresponding one of the first thin film transistors, and each first static display unit configured for providing voltage to a corresponding one of the first pixel electrodes in a static display mode of the liquid crystal display device; and a plurality of second static display unite each comprising an output terminal electrically coupled to a corresponding one of the second thin film transistors, and each second static display unit configured for providing voltage to a corresponding one of the second pixel electrodes in the static display mode.

2. The driving circuit as claimed in claim 1, wherein an area of the first pixel electrode is equal to that of the second pixel electrode.

3. The driving circuit as claimed in claim 1, wherein an area of the first pixel electrode is different to that of the second pixel electrode.

4. The driving circuit as claimed in claim 1, wherein a ratio of an area of the first pixel electrode to that of the second pixel electrode is 1:2.

5. The driving circuit as claimed in claim 1, wherein each of the first and second static display units comprises a static random access memory, a third thin film transistor, a fourth thin film transistor, a drain electrode of the third thin film transistor is electrically coupled to a terminal of the static random access memory, and a source electrode of the third thin film transistor is electrically coupled to the output terminal of the static display unit, a source electrode of the fourth thin film transistor is electrically coupled to another terminal of the static random access memory, and a drain electrode of the third thin film transistor is electrically coupled to the output terminal of the static display unit.

6. A liquid crystal display device, comprising:
a first substrate comprising:
a plurality of parallel scan lines;
a plurality of first parallel data lines substantially orthogonal to the scan lines;
a plurality of second parallel data lines substantially orthogonal to the scan lines and parallel to the first data lines;
a plurality of first thin film transistors, each positioned near a crossing of a corresponding one of the scan lines and a corresponding one of the first data lines;
a plurality of second thin film transistors, each positioned near a crossing of a corresponding one of the scan lines and a corresponding one of the second data lines;
a plurality of first pixel electrodes electrically coupled to the first thin film transistors;
a plurality of second pixel electrodes electrically coupled to the second thin film transistors;
a plurality of first static display units each comprising an output terminal electrically coupled to a corresponding one of the first thin film transistors, and each first static display unit configured for providing voltage to a corresponding one of the first pixel electrodes in a static display mode of the liquid crystal display device; and
a plurality of second static display unite each comprising an output terminal electrically coupled to a corresponding one of the second thin film transistors, and each second static display unit configured for providing voltage to a corresponding one of the second pixel electrodes in the static display mode;
a second substrate facing the first substrate; and
a liquid crystal layer sandwiched between the first substrate and the second substrate.

7. The liquid crystal display device as claimed in claim 6, wherein an area of the first pixel electrode is equal to that of the second pixel electrode.

8. The liquid crystal display device as claimed in claim 6, wherein an area of the first pixel electrode is different to that of the second pixel electrode.

9. The liquid crystal display device as claimed in claim 6, wherein a ratio of an area of the first pixel electrode to that of the second pixel electrode is 1:2.

10. The liquid crystal display device as claimed in claim 6, wherein each of the first and second static display units comprises a static random access memory, a third thin film transistor, a fourth thin film transistor, a drain electrode of the third thin film transistor is electrically coupled to a terminal of the static random access memory, a source electrode of the third thin film transistor is electrically coupled to the output terminal of the static display unit, a source electrode of the fourth thin film transistor is electrically coupled to another terminal of the static random access memory, and a drain electrode of the third thin film transistor is electrically coupled to the output terminal of the static display unit.

* * * * *